United States Patent
Crauwels et al.

(10) Patent No.: US 11,879,164 B2
(45) Date of Patent: Jan. 23, 2024

(54) METHOD FOR THE RECOVERY OF PLATINUM GROUP METALS FROM CATALYSTS COMPRISING SILICON CARBIDE

(71) Applicant: UMICORE, Brussels (BE)

(72) Inventors: Dirk Crauwels, Olen (BE); Tim Van Rompaey, Olen (BE); Hilke Verbruggen, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 17/791,001

(22) PCT Filed: Dec. 18, 2020

(86) PCT No.: PCT/EP2020/087265
§ 371 (c)(1),
(2) Date: Jul. 6, 2022

(87) PCT Pub. No.: WO2021/140012
PCT Pub. Date: Jul. 15, 2021

(65) Prior Publication Data
US 2023/0034873 A1   Feb. 2, 2023

(30) Foreign Application Priority Data

Jan. 10, 2020  (EP) .................................... 20151085

(51) Int. Cl.
C22B 11/02 (2006.01)
(52) U.S. Cl.
CPC .................. C22B 11/026 (2013.01)
(58) Field of Classification Search
CPC .................................................. C22B 11/026
See application file for complete search history.

(56) References Cited

U.S. PATENT DOCUMENTS

2022/0259697 A1* 8/2022 Sugawara ................. C22B 5/06

FOREIGN PATENT DOCUMENTS

| CN | 107400784 | A | * | 11/2017 |
| CN | 108441647 | A | | 8/2018 |
| JP | 2007224336 | A | | 9/2007 |
| JP | 2011032510 | A | | 2/2011 |
| JP | 4852749 | B2 | * | 1/2012 |
| JP | 4852749 | B2 | | 1/2012 |
| JP | 2012167323 | A | | 9/2012 |
| JP | 5851700 | B2 | | 2/2016 |

OTHER PUBLICATIONS

Espacenet machine translation of JP4852749B2 retrieved on May 18, 2023 (Year: 2012).*
Espacenet machine translation of CN-107400784-A retrieved on May 18, 2023 (Year: 2017).*
ISA/EP; International Search Report and Written Opinion for International Patent Application No. PCT/EP2020/087265 dated Mar. 31, 2021, 13 pages.
WIPO; International Preliminary Report on Patentability for International Patent Application No. PCT/EP2020/087265 dated May 9, 2022, 11 pages.
Wiraseranee, Chompunoot, et al., "Dissolution Behavior of Platinum in Na2O SiO2 Based Slags", Materials Transactions, vol. 55, No. 7, Jan. 1, 2014, 8 pages.
Morita, Kazuki, et al., "Dissolution behaviour of platinum group metals into molten slags", Transactions—Institution of Mining and Metallurgy, vol. 123, No. 1, Dec. 26, 2013, 7 pages.
Peng, Zhiwei, et al., "Pyrometallurgical Recovery of Platinum Group Metals from Spent Catalysts", Journal of Metals, vol. 69, No. 9, Jul. 10, 2017, 10 pages.
Antonov, Andrey, et al., "Method for Platinum Group Metals Extraction from SiC Based Catalyst Carrier", 2019 IEEE International Conference on Electrical Engineering and Photonics, Oct. 17, 2019, 4 pages.

* cited by examiner

*Primary Examiner* — Jophy S. Koshy
*Assistant Examiner* — Joshua S Carpenter
(74) *Attorney, Agent, or Firm* — NK Patent Law

(57) ABSTRACT

The invention concerns a process suitable for the recovery of platinum group metals (PGM) present in PGM-bearing catalysts comprising silicon carbide (SiC). More particularly, the process for the recovery of PGM present in PGM-bearing catalysts comprising SiC, comprises the steps of preparing a metallurgical charge by mixing the PGM-bearing catalysts with an Fe-oxide compound in an amount sufficient to oxidize at least 65% of the SiC, and feeding the metallurgical charge and slag formers to a smelting furnace operating in conditions susceptible to form a liquid Fe-based bullion, which contains PGM, and a liquid slag. Good to excellent PGM yields are obtained.

10 Claims, No Drawings

METHOD FOR THE RECOVERY OF PLATINUM GROUP METALS FROM CATALYSTS COMPRISING SILICON CARBIDE

CROSS-REFERENCE TO RELATED APPLICATIONS

This application is a U.S. National Stage application of International Patent Application No. PCT/EP2020/087265, filed on Dec. 18, 2020, which claims the benefit of European Patent Application No. 20151085.6, filed on Jan. 10, 2020.

The invention concerns a process suitable for the recovery of platinum group metals (PGM) present in PGM-bearing catalysts comprising silicon carbide (SiC).

Such PGM-bearing compounds can be spent automotive catalysts (SAC), also including catalyzed diesel particulate filters (c-DPF). There are mainly three different substrate material types used for a c-DPF: silicon carbide (SiC), aluminium titanate and cordierite ($2MgO \cdot 2Al_2O_3 \cdot 5SiO_2$). SiC dominates in light duty diesel applications. Cordierite dominates in heavy duty diesel (HDD) applications, although there are HDD applications containing SiC, too. The increasing popularity of SiC comes from its excellent heat resistance, enhancing the durability of a catalyst when used as a carrier substance.

A possible process suitable for the recovery of PGM from PGM-bearing catalysts is to smelt the catalysts in the presence of a slag and of a metallic phase: the PGM tend to collect in the metallic phase, which can then be further processed to concentrate and separate the PGM.

SiC, if present in such PGM-bearing catalysts, is however difficult to react and to dissolve. This is due to its chemically inert character and to its high melting point of about 2700° C. Moreover, it is relatively light and tends to float at the surface of a molten bath.

Unreacted SiC will block some of the PGM in the slag, thus decreasing their yield in the metal phase assumed to collect them. This problem is exacerbated when the relative amount of SiC in the catalysts exceeds 2.5% by weight, especially so when it exceeds 5%.

Nevertheless, JP2011032510 describes a method of recovering gold and/or platinum group elements from a SiC-based substance, wherein the SiC-content is higher than 2.5%. A 2-step process is used.

In a first step, a SiC-based substance is melted and oxidized in a first furnace in presence of an alkali metal oxide, an alkali metal carbonate and/or an alkali metal hydroxide, and an oxide containing an alkali metal oxide as a main component, and, optionally, metallic copper. The oxidation potential is relatively high, as demonstrated by the significant fraction of Cu that reports to the slag. This loss of Cu in the slag is a clear disadvantage. The slag has indeed to be separated and subjected to a second step, performed in reducing atmosphere, to recover the Cu therein contained. In this second step, the metal oxide produced in the first step is melted and reduced in a second furnace together with a reducing agent and metallic copper or copper oxide. The slag of the oxidation furnace is an alkali-based slag.

This two-step process is rather time-consuming and the used alkali metal oxide compounds may cause PGM-losses to the slag. These losses become even more likely with the increase in slag basicity, as for example demonstrated by Morita et al. (Transactions of the Institutions of Mining and Metallurgy: Section C, Mineral Processing and Extractive Metallurgy, Vol. 123, 29-34, 2014) or by Wiraseranee et al. (The Japan Institute of Metals and Materials, Materials Transactions, Vol. 55, 1083-1090, 2014).

CN108441647 and ZHIWEI et al. (JOM: Journal of Metals 69 (9), pages 1553-1562, 2017) describe that Fe-oxide additions may form a PGM collector. However, these documents remain completely silent about a possible treatment of SiC, and do not refer to the problem that a high amount of SiC interferes with the recovery of PGM.

It has now been found that at least one of the above disadvantages can be overcome using a single melting step, even if the SiC-content present in the PGM-bearing catalysts is significantly higher than 2.5%. A key to achieve excellent yields of PGM is the use of a sufficient amount of an Fe-oxide compound blended with the PGM-bearing catalysts comprising SiC before smelting.

More particularly, the process for the recovery of PGM present in PGM-bearing catalysts comprising SiC, comprises the steps of preparing a metallurgical charge by mixing the PGM-bearing catalysts with an Fe-oxide compound in an amount sufficient to oxidize at least 65% of the SiC, and feeding the metallurgical charge and slag formers to a smelting furnace operating in conditions susceptible to form a liquid Fe-based bullion, which contains PGM, and a liquid slag. In this process, the SiC-containing material is oxidized by the Fe-oxide compound, which is reduced to metallic iron, which collects the PGM.

In a preferred embodiment according to above embodiment, said PGM-bearing catalyst comprises spent automotive catalysts and/or spent catalyzed diesel particulate filters.

By "PGM" are meant the elements Ru, Rh, Pd, Os, Ir, and Pt.

By "an amount sufficient to oxidize 65% of the SiC" is meant that the amount is sufficient to oxidize at least 65% by weight of the SiC present in the feed, taking the stoichiometry of the reaction into account. The stoichiometry can be derived from the expected reaction whereby iron is reduced to its metallic form, e.g. according to: $SiC + Fe_2O_3 \rightarrow SiO_2 + CO + 2\ Fe$ when using hematite, or $4\ SiC + 3\ Fe_3O_4 \rightarrow 4\ SiO_2 + 4\ CO + 9\ Fe$ when using magnetite. The expected reaction of other Fe-oxides can easily be determined by the skilled person.

In the redox conditions prevailing in the smelting step, it is hereby assumed that the Fe-oxide compound oxidizes SiC essentially to $SiO_2$ and CO. This CO may be further oxidized to $CO_2$ after leaving the melt, e.g. by contacting ambient air.

By "Fe-bullion, which contains PGM" is meant that the PGM present in the feed are, to a large extent, recovered in the Fe-based bullion. A PGM yield of at least 80% is preferred, this figure being defined as the global yield with respect to the total of all PGM present in the feed.

The global PGM yield of at least 80% is typically obtained when using an Fe-oxide compound in an amount sufficient to oxidize 65% of the SiC. Higher global yields, such as 98%, or 99% are however preferred. Hitherto, an amount of Fe-oxide sufficient to oxidize at least 80% of the SiC may be necessary.

Highly under-stoichiometric amounts of Fe-oxide, such as less than 65%, may lead to incomplete oxidation of SiC, and, consequently, to insufficient PGM yields. Global PGM yields below 80% are considered insufficient, while yields of at least 98% are considered excellent.

Higher amounts of Fe-oxide are possible, but stoichiometries such as above 200% are not only for economic reasons considered disadvantageous, but also as these would lead to the formation of a large quantity of Fe-bullion, thereby unnecessarily diluting the PGM. In practice, a small stoichiometric excess of Fe-oxide, such as 10% to 20% of excess, may be most preferred to ensure a complete conversion of the SiC while also avoiding excessive dilution.

In order to achieve high global yields of PGM, while preferably keeping the amount of Fe-oxide used as low as possible, mixing or blending of the PGM-bearing catalysts comprising SiC with Fe-oxide is required prior to smelting. It is assumed that the oxygen of the Fe-oxide is released and oxidizes the SiC to $SiO_2$ and CO more easily when both reagents are in close contact during smelting.

As further advantages of the invention, no foaming and also no increase in the slag viscosity is observed.

A preferred embodiment according to above embodiments, comprises the additional step of slagging part of the Fe present in the Fe-bullion by blowing oxygen into the melt, thereby further concentrating the PGM in the remaining Fe-based bullion.

In preferred embodiment according to above embodiments, a Ni-compound is fed to the smelting furnace, comprising the additional step of slagging at least a major part of the Fe by blowing oxygen into the melt, thereby concentrating the PGM in a Ni- or FeNi-based bullion. The initial FeNi-bullion, i.e. before blowing oxygen into the melt, preferably contains about 5 to 20% by weight of nickel. At least 50% by weight of the Fe present in the bullion is then oxidized and converted to the slag. The redox potential is chosen so as to keep the nickel in the metallic state. This additional converting step may result in a bullion having a higher PGM concentration.

In a preferred embodiment according to above embodiments, the SiC amounts to more than 2.5% by weight of the PGM-bearing catalysts. The new process is indeed especially suited for treating catalysts containing SiC significantly above said 2.5%, such as more than 5%, or such as more than 10% (by weight), which are problematic for most existing recovery processes. The new process is even suitable for the treatment of pure SiC-based c-DPF, typically comprising amounts of around 90% SiC or more.

In a preferred embodiment according to above embodiments, the PGM-bearing catalysts comprising SiC together with the Fe-oxide compound amount to more than 80% by weight of the metallurgical charge. The metallurgical charge may optionally contain slag formers such as lime and sand, which can be added to the mixture of catalyst and Fe-oxide in the appropriate amount to form a slag with a liquidus temperature of about 1500° C. in the ternary $CaO-SiO_2-Al_2O_3$ diagram. The total amount of slag formers should preferably not exceed 20% of the total mixture, to preserve the close proximity of SiC and the Fe-oxide compound.

Another embodiment according to above embodiments, comprises the additional step of separating the PGM-containing bullion from the slag. The separation of the bullion and the slag can be performed by tapping.

In a preferred embodiment according to above embodiments, the Fe-oxide compound is chosen from $Fe_3O_4$, $Fe_2O_3$, $CaFeO_4$ or $K_2FeO_4$. Other metal-oxides, such as for example NiO, CuO or $Cu_2O$, can serve the same purpose in the claimed process, as they are also suitable to collect PGM.

Metal oxides with a higher percentage of oxygen are, however, preferred for practical and economical reasons, as for example 1 mol of $Fe_2O_3$ is sufficient to oxidize 1 mol of SiC, while 3 mol of CuO or NiO would be required.

The catalyst is broken and milled to a particle size preferably passing a 10 mesh sieve, more preferably passing 18 mesh; alternatively, particles preferably have a $d_{50}$ of less than 2000 μm, more preferably less than 1000 μm, and even more preferably less than 500 μm. The Fe-oxide is, if needed, comminuted to a similar particle size. Catalyst and Fe-oxide are then blended, typically by using mechanical means. The blending is complete when a homogeneous mix of the different components is obtained, as confirmed by a uniform color of the mixture.

This mixture, which forms the metallurgical charge, will typically be added to a molten slag phase, comprising e.g. 10 to 40% $Al_2O_3$, 20 to 60% $SiO_2$, 10 to 40% CaO, and 0 to 15% MgO, and melted in a reducing atmosphere, i.e. a $pO_2$ of e.g. $10^{-12}$ to $10^{-14}$ atm, preferably about $10^{-13}$ atm, such that the SiC-based substance is oxidized and the Fe-oxide reduced. Theoretical calculations indicate that working in a $pO_2$ range of $10^{-10}$ to $10^{-17}$ atm is possible. However, working outside the preferred $pO_2$ range of $10^{-12}$ to $10^{-14}$ atm, for example at $10^{-10}$ to $10^{-11}$ atm or $10^{-15}$ to $10^{-16}$ atm, is economically not relevant and may also lead to extra purification steps, which are not necessary with the current process.

$N_2$ can be blown into the slag phase to enhance the mixing, ensuring that the Fe-oxide and catalyst mixture is entrained into the melt.

EXAMPLE 1

In this experiment, Fe-oxide is added to PGM-bearing catalysts comprising SiC in a 1:1 stoichiometric amount, i.e. 1 mol of $Fe_2O_3$ per mol of SiC.

750 g of a slag-forming flux comprising 34% $SiO_2$, 26% $Al_2O_3$, 14% CaO, and 7% MgO is melted and heated to 1550° C. under an $N_2$-atmosphere. When everything is melted, $N_2$-gas is blown at a rate of 50 L/h into the slag.

560 g PGM-bearing catalyst ($d_{50}$ of 100 82 m) comprising 42% SiC, 30% $SiO_2$, 20% $Al_2O_3$, 0.6% CaO, 3% MgO, 1741 ppm Pt, 1114 ppm Pd, and 41 ppm Rh is mixed with 954 g $Fe_2O_3$ ($d_{50}$ of 250 μm) until a homogeneous mixture is obtained (Table 1). This mixture is then charged stepwise, about 50 g at a time with 5 minutes in-between the additions, to give time for the mixture to dissolve into the slag and for the reaction to take place. After everything is charged, the blowing of $N_2$-gas continues at a rate of 50 L/h for 2 hours. After that, the furnace remains at 1550° C. for 30 minutes to allow for phase separation.

559.8 g of a high-density Fe-bullion containing PGM (lower layer) and 1567 g of a low-density slag (upper layer) are formed (Table 2). The Fe-bullion comprises 98% Fe, 0.7% C, 1730 ppm Pt, 1111 ppm Pd and 41 ppm Rh. Hence, the Fe-bullion collects the PGM with a global yield of more than 99%.

TABLE 1

Composition of the feed

| Feed | Weight (g) | Pt (ppm) | Pd (ppm) | Rh (ppm) | $Fe_2O_3$ (%) | SiC (%) | $SiO_2$ (%) | $Al_2O_3$ (%) | CaO (%) | MgO (%) |
|---|---|---|---|---|---|---|---|---|---|---|
| Slag | 750 | | | | | | 34 | 26 | 14 | 7 |
| Charge | 1514 | 644 | 412 | 15 | 63 | 15 | 11 | 7 | 0.2 | 1 |

TABLE 2

| | | | | | Composition of the products | | | | |
|---|---|---|---|---|---|---|---|---|---|
| Product | Weight (g) | Pt (ppm) | Pd (ppm) | Rh (ppm) | Fe (%) | C (%) | $SiO_2$ (%) | $Al_2O_3$ (%) | CaO (%) | MgO (%) |
| Slag | 1567 | <5 | <5 | <5 | 9 | | 45 | 32 | 6 | 4 |
| Bullion | 559.8 | 1730 | 1111 | 41 | 98 | 0.7 | | | | |

EXAMPLE 2

Fe-oxide is added to PGM-bearing catalysts comprising SiC in a slightly under-stoichiometric amount, i.e. 0.8 mol of $Fe_2O_3$ per mol of SiC.

750 g of a slag-forming flux comprising 34% $SiO_2$, 26% $Al_2O_3$, 14% CaO, and 7% MgO is melted and heated to 1550° C. under an $N_2$-atmosphere. When everything is melted $N_2$-gas is blown at a rate of 50 L/h into the slag.

560 g PGM-bearing catalyst ($d_{50}$ of 100 μm) comprising 42% SiC, 30% $SiO_2$, 20% $Al_2O_3$, 0.6% CaO, 3% MgO, 1741 ppm Pt, 1114 ppm Pd, and 41 ppm Rh is mixed with 763 g $Fe_2O_3$ ($d_{50}$ of 250 μm) until a homogeneous mixture is obtained.

This mixture is then charged stepwise, about 50 g at a time with 5 minutes in-between the additions, to give time for the mixture to dissolve into the slag and for the reaction to take place. After everything is charged, the blowing of $N_2$-gas continues at a rate of 50 L/h for a total of 2 hours. After that, the furnace remains at 1550° C. for 30 minutes to allow for phase separation.

370.1 g of a high-density Fe-bullion containing PGM (lower layer) and 1638 g of a low-density slag (upper layer) are formed. The Fe-bullion comprises 87% Fe, 1.6% C, 2585 ppm Pt, 1659 ppm Pd and 62 ppm Rh. Hence, the Fe-bullion collects the PGM with a global yield of more than 98%.

The best yields are obtained with a stoichiometric amount of $Fe_2O_3$ with respect to the amount of SiC present in the mixture. However, a slightly under-stoichiometric amount can also collect the PGM with a sufficient yield.

COMPARATIVE EXAMPLE 3

Fe-oxide is added to PGM-bearing catalysts comprising SiC in an under-stoichiometric amount, i.e. 0.6 mol of $Fe_2O_3$ per mol of SiC.

750 g of a slag-forming flux comprising 34% $SiO_2$, 26% $Al_2O_3$, 14% CaO, and 7% MgO is melted and heated to 1550° C. under an $N_2$-atmosphere. When everything is melted $N_2$-gas is blown at a rate of 50 L/h into the slag.

560 g PGM-bearing catalyst ($d_{50}$ of 100 μm) comprising 42% SiC, 30% $SiO_2$, 20% $Al_2O_3$, 0.6% CaO, 3% MgO, 1741 ppm Pt, 1114 ppm Pd, and 41 ppm Rh is mixed with 572 g $Fe_2O_3$ ($d_{50}$ of 250 μm) until a homogeneous mixture is obtained.

This mixture is then charged stepwise, about 50 g at a time with 5 minutes in-between the additions, to give time for the mixture to dissolve into the slag and for the reaction to take place. After four additions, the molten bath becomes slightly viscous. After everything is charged, blowing of $N_2$-gas continues at a rate of 50 L/h for a total of two hours. After that, the furnace remains at 1550° C. for 30 minutes to allow for phase separation. At the end the bath is somewhat viscous.

377.9 g of a high-density Fe-bullion containing PGM (lower layer) and 1457 g of a low-density slag (upper layer) are formed. The Fe-bullion comprises 74% Fe, 1.6% C, 1500 ppm Pt, 1416 ppm Pd and 54 ppm Rh. Hence, the Fe-bullion has collected Pt with a yield of 58%, Pd with a yield of 86% and Rh with a yield of 88%. The global PGM yield amounts to 69%, which is considered insufficient.

Using only a 60% stoichiometry, the bath becomes somewhat viscous. This is assumed to be due to unreacted solid SiC particles. An inadmissible amount of PGM is then lost to the slag.

COMPARATIVE EXAMPLE 4

Fe-oxide is added to PGM-bearing catalysts comprising SiC in a highly sub-stoichiometric amount, i.e. 0.3 mol of $Fe_2O_3$ per mol of SiC, and $O_2$-gas is blown through the mixture instead of N2-gas as in examples 1, 2, and 3.

1595 g of a slag-forming flux comprising 36% $SiO_2$, 11% $Al_2O_3$, 38% CaO, and 9% MgO is melted and heated to 1500° C. under an $N_2$-atmosphere. The Fe-oxide being insufficiently present, and in an attempt to oxidize the SiC, a more than stoichiometric amount of $O_2$-gas is blown at a rate of 100 L/h into the slag.

613 g PGM-bearing catalyst ($d_{50}$ of 150 μm) comprising 57% SiC, 26% $SiO_2$, 13% $Al_2O_3$, 0.7% CaO, 2% MgO, 1056 ppm Pt, 384 ppm Pd, 11.58 ppm Rh is mixed with 450 g $Fe_2O_3$ (d50 of 250 μm) until a homogeneous mixture is obtained. This amount of Fe-oxide accounts for around 30% of what would be needed to completely transform the amount of SiC present.

The mixture is then charged stepwise, about 50 g at a time with 5 minutes in-between the additions, to give time for the mixture to dissolve into the slag and for the reaction to take place. The mixture dissolves for the most part, but a small part forms a dross on top of the slag phase. The molten bath becomes very viscous. After 100 minutes the blowing is stopped. The furnace remains at 1500° C. for 30 minutes to allow for phase separation.

3.2 g of an Fe-bullion (lower layer) and 2642 g of a heterogeneous slag phase (upper layer) are formed. Said heterogeneous slag phase still contains alloy droplets, which could not be separated anymore, e.g. by tapping, and therefore contribute to PGM-losses to the slag. The formed Fe-bullion comprises 81% Fe, 2.4% Pd, but no Pt and no Rh. Hence, the Fe-bullion collects PGM with a global yield of only 4.3%. This yield is totally unsatisfactory. The slag is viscous and still comprises unreacted SiC particles.

Also, blowing $O_2$-gas through the mixture is not effective to achieve the same result as with Fe-oxide.

COMPARATIVE EXAMPLE 5

PGM-bearing catalysts comprising SiC and Fe-oxides are separately added to the slag in a stoichiometric amount, i.e. 1 mol of $Fe_2O_3$ per mol of SiC, thus without prior mixing or blending. 750 g of a slag-forming flux comprising 34% $SiO_2$, 26% $Al_2O_3$, 14% CaO, and 7% MgO is melted and heated to 1550° C. under an $N_2$-atmosphere. When everything is melted, $N_2$-gas is blown at a rate of 50 L/h into the slag.

560 g PGM-bearing catalyst (d50<100 μm) comprising 42% SiC, 30% $SiO_2$, 20% $Al_2O_3$, 0.6% CaO, 3% MgO, 1741 ppm Pt, 1114 ppm Pd, and 41 ppm Rh is then charged stepwise, about 30 g at a time, to the slag phase. After each addition of catalyst material, about 50 g of $Fe_2O_3$ (d50 of 250 μm) is added to the molten bath, for a total of 954 g. 5 to 10 minutes are provided for the materials to dissolve into the slag and react between additions. After 5 additions, a layer of foam forms on top of the bath, which remains there until the end of the experiment.

After everything is charged, the blowing of $N_2$ continues at a rate of 50 L/h for a total of 2 hours. After that, the furnace remains at 1550° C. for 30 minutes to allow for phase separation.

463 g of a high-density Fe-bullion containing PGM (lower layer) and 1691 g of a low-density slag (upper layer) are formed. The Fe-bullion comprises of 98% Fe, 0.2% C, 1381 ppm Pt, 999 ppm Pd and 39 ppm Rh. Hence, the Fe-bullion has collected Pt with a yield of 66%, Pd with a yield of 74% and Rh with a yield of 78%. The global PGM yield amounts to 69%, which is considered insufficient.

When PGM-bearing catalysts comprising SiC and $Fe_2O_3$ are not mixed before feeding the metallurgical charge, foaming is observed, and the oxidation of SiC is incomplete. As a result, an inadmissible amount of PGM is lost to the slag.

The invention claimed is:

1. A process for the recovery of platinum group metals (PGM) present in PGM-bearing catalysts comprising SiC, comprising the steps of:
   preparing a metallurgical charge, by mixing the PGM-bearing catalysts with an Fe-oxide compound in an amount sufficient to oxidize at least 65% of the SiC; and,
   feeding the metallurgical charge and slag formers to a smelting furnace operating in conditions susceptible to form a melt comprising a liquid Fe-based bullion, which contains PGM, and a liquid slag.

2. The process according to claim 1, wherein the PGM-bearing catalysts comprise spent automotive catalysts and/or spent catalyzed diesel particulate filters.

3. The process according to claim 1, comprising the additional step of slagging part of the Fe present in the Fe-base bullion by blowing oxygen into the melt, thereby concentrating the PGMin the remaining Fe-based bullion.

4. The process according to claim 1, further comprising feeding a Ni-compound to the smelting furnace and blowing oxygen into the melt, whereby at least 50% by weight of the Fe present in the Fe-base bullion is slagged, thereby concentrating the PGM in a Ni- or FeNi-based bullion.

5. The process according to claim 1, wherein the SiC amounts to more than 2.5% by weight of the PGM-bearing catalysts.

6. The process according to claim 1, wherein more than 80% by weight of the metallurgical charge is the PGM-bearing catalysts comprising SiC together with the Fe-oxide compound.

7. The process according to claim 1, comprising the additional step of separating the Fe-based bullion which contains PGM from the slag.

8. The process according to claim 1, wherein the Fe-oxide compound is $Fe_3O_4$, $Fe_2O_3$, $CaFeO_4$ or $K_2FeO_4$.

9. The process according to claim 1, where, in the step of preparing the metallurgical charge, the PGM-bearing catalysts are comminuted to particles having a d50 of less than 2000 μm.

10. The process according to claim19, wherein the Fe-oxide compound is comminuted to particles having a d50 of less than 2000 μm.

* * * * *